United States Patent

[11] 3,593,703

[72] Inventors Leonard C. Gunn
 Chicago, Ill.;
 Donald A. Burns, Kenosha, Wis.
[21] Appl. No. 839,309
[22] Filed July 7, 1969
[45] Patented July 20, 1971
[73] Assignee Abbott Laboratories

[54] DIAGNOSTIC COUGH-MONITORING TECHNIQUES
 5 Claims, 3 Drawing Figs.
[52] U.S. Cl. .................................. 128/2 R,
 179/1, 340/279
[51] Int. Cl. .................................. A61b 5/00
[50] Field of Search .......................... 128/2, 2.1
 A, 1

[56] References Cited
UNITED STATES PATENTS
3,210,747 10/1965 Clynes.......................... 128/2.1 X
FOREIGN PATENTS
124,582 8/1958 U.S.S.R. ....................... 128/2.1
OTHER REFERENCES
Barr, N. L., THE MILITARY SURGEON, Feb. 1954, Vol. 114, No. 2 pp. 79—83, (copy in GR. 335, CL. 128/2.1)
Geddes, L. A. et al., AMER. JOURN. OF MED. ELECTRONICS, Jan-Mar, 1962, pp. 62—69 (copy in GR. 335, CL. 128/2.1)
Kahn, A. et al., AMER. JOURN. OF MED. ELECTRONICS, Apr.-June, 1963, pp. 152—157 (copy in GR. 335, CL. 128/2.1)

Winter, C. A., et al., P.S.E.B.M., 1952, Vol. 81, pp. 463-—465.
Bickerman, H. A., et al., THE AMER. JOURN. OF MEDICAL SCIENCES, July, 1956, pp. 57—66.
Bickerman, H. A., et al., THE AMER. JOURN. OF MEDICAL SCIENCES, Aug., 1957, pp. 191—206.
Bickerman, H. A., ANTITUSSIVE AGENTS, Vol. 3, No. 3, 1962, pp. 353—368.
Woolf, C. R. et al., THORAX, 1964, Vol. 19, pp. 125—130.
Sevelius, H. et al., THE JOURNAL OF NEW DRUGS, July-Aug., 1966, pp. 216—223.
Reece, C. A., et al., AMER. JOURNAL OF DISEASES IN CHILDHOOD, Vol. 112, Aug., 1966, pp. 124—128.
Loudon, R. G. et al., MED. RESEARCH ENGINEERING, Vol. 6, 1967, pp. 25—27.
Sevelius, H., et al., CURRENT MEDICAL DIGEST, Feb., 1967, pp. 299 and 302.
Huizinga, E., ANNALS OF OTOLOGY, RHINOLOGY & LARYNGOLOGY, Vol. 76, No. 5, Dec. 1967, pp. 923—934.
Simonsson, B. G., et al., THE JOURN. OF CLINICAL INVESTIGATION Vol. 46, No. 11, 1967, pp. 1812—1818.

Primary Examiner—Richard A. Gaudet
Assistant Examiner—Kyle L. Howell
Attorney—Molinare, Allegretti, Newitt & Witcoff ABSTRACT: The rate at which a human subject coughs may be determined by providing a microphone, a transmitter connected to the microphone, a receiver, a counter, and a conditioning circuit that enables the counter to advance in response to a cough sound.

PATENTED JUL 20 1971 3,593,703
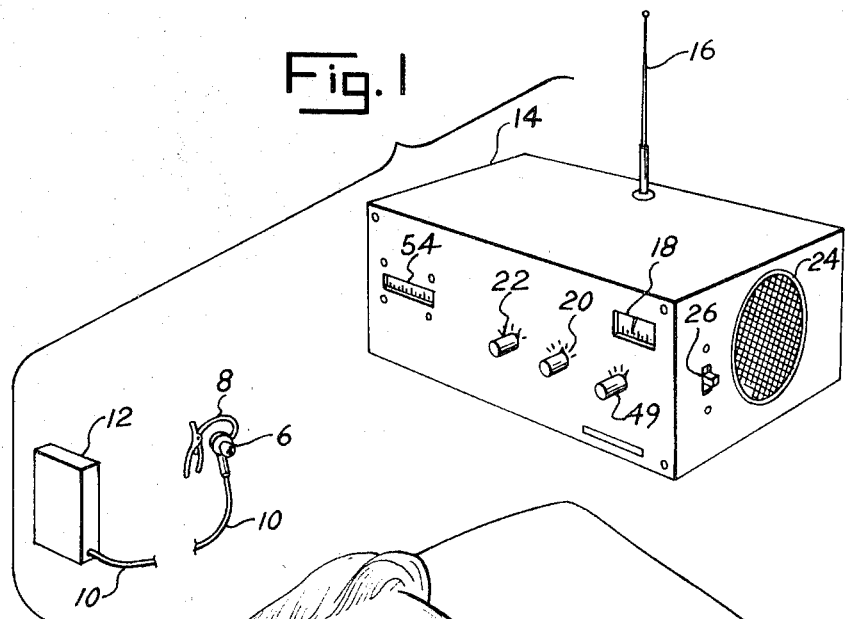
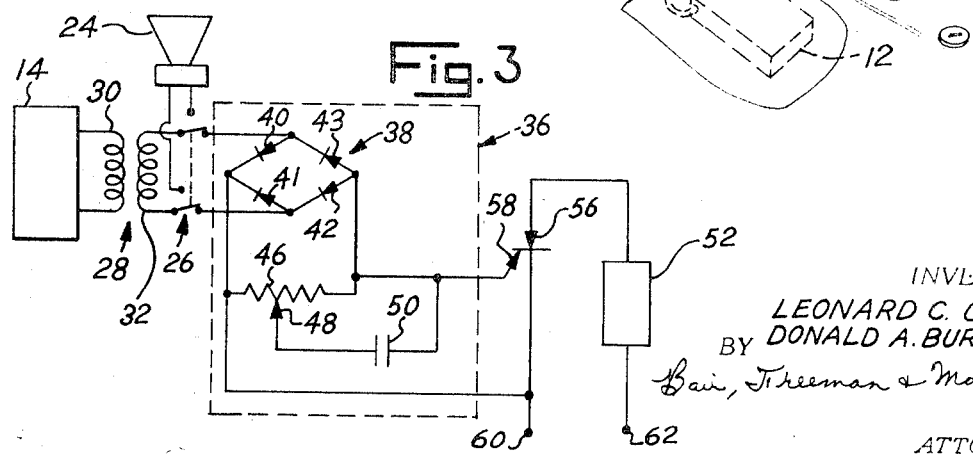
INVENTORS
LEONARD C. GUNN &
BY DONALD A. BURNS
Bair, Freeman & Molinare
ATTORNEYS

3,593,703

DIAGNOSTIC COUGH-MONITORING TECHNIQUES

BACKGROUND OF THE INVENTION

1. Field of the Invention

This invention basically relates to medical diagnostic methods, and is more particularly related to techniques for monitoring the rate at which a human subject coughs.

2. Description of the Prior Art

The rate at which a patient coughs is of great interest to a physician who wishes to know the condition of his patient, and to a research scientist who wishes to test the effectiveness of medication adapted to alleviate coughing. Unfortunately, until the discovery of the present invention, determination of a patient's cough rate has depended on a variety of techniques requiring an inordinate expenditure of time or undue restriction of the patient's mobility.

Of course, the rate at which a patient coughs may be determined by manual count of a third party, such as a nurse. However, since this technique requires the continual presence of highly trained personnel, it is generally too costly to be of practical value. Moreover, the technique is susceptible to a variety of human errors and is impossible to standardize, since some personnel will count insignificant, low-volume coughs whereas others will ignore such sounds, or fail to hear them at all.

The coughing sounds uttered by a patient may also be captured on a tape recorder. However, no saving of time or effort is thereby achieved, since trained personnel must, at some point, play back the tape and count the number of coughs recorded.

Certain mechanical devices designed to determine the rate at which a patient coughs have been devised, although each has exhibited deficiencies that have limited its usefulness. Such devices comprise a pneumatic band that is snugly fitted around the patient's chest. This aspect of the device is a source of discomfort for the patient and raises the possibility that he may surreptitiously disconnect the tube for substantial periods of time. Thus, the device is of doubtful reliability unless the patient is closely supervised. The pneumatic band in such devices is connected to a recording machine through pneumatic tubes. This feature of the device obviously restricts the movement of the patient so that no record of coughing is made when the patient disconnects the tubes in order to leave his area of confinement. Aside from the foregoing deficiencies, these devices have not always been able to distinguish between deep breathing and coughing sounds, and have been capable of standardizing the type of cough counted to only a limited extent.

SUMMARY OF THE INVENTION

It has been surprisingly discovered that the rate at which a patient coughs may be accurately determined by using a microphone, a transmitter, a receiver, a conditioning circuit, and a counter. In order to use the invention to best advantage, the microphone is placed adjacent a patient's throat so that coughing sounds (as well as other sounds uttered by the patient) are converted into corresponding electrical currents. The transmitter, which is preferably a small, miniature semiconductor type that can be held in the patient's pocket, transmits waves corresponding to the currents. The waves are reconverted to electrical signals by the receiver in a well-known manner. The signals produced by the receiver are conditioned so that signals corresponding to coughing sounds cause the counter to advance, whereas signals corresponding to other types of sounds ordinarily cause the counter to remain inactive.

The advantages achieved by the invention are at once apparent. Since the microphone may be extremely small and lightweight, it can be conveniently clipped to the collar of the patient's shirt or even taped to his throat without creating any discomfort. The patient has little or no incentive to remove such a microphone, and the reliability of the device is thereby increased. Of course, no wires connect the transmitter to the receiver, so that the patient's movement is in no way restricted. Thus, the patient's coughing rate may be continuously monitored, even when the patient leaves the room in which he is confined.

The invention has been thoroughly tested and is able to determine coughing rates with a surprising degree of accuracy. Moreover, the magnitude of the coughing sound to be monitored may be precisely ascertained and standardized by controlling the gain of the receiver and by properly adjusting the conditioning circuit. This feature is extremely important, since meaningful research cannot be conducted until the type of cough under investigation is defined and distinguished from other types of sounds.

DESCRIPTION OF THE DRAWING

These and other advantages and features of the present invention will hereafter appear for purposes of explanation, but not limitation, in connection with the accompanying drawing in which like numbers refer to like parts throughout, and in which:

FIG. 1 is a perspective view of a preferred form of apparatus made in accordance with the present invention;

FIG. 2 is an enlarged, perspective view of the microphone and transmitter of FIG. 1 shown in connection with a patient whose coughing rate is to be monitored; and FIG. 3 is a schematic diagram of a preferred form of a conditioning circuit used in connection with the receiver shown in FIG. 1.

DESCRIPTION OF THE PREFERRED EMBODIMENT

Referring to the drawing, a preferred form of the present invention basically comprises a microphone 6, a portable FM radio transmitter 12, an FM radio receiver 14, a conditioning circuit 36, and a counter 52.

More specifically, microphone 6 is a miniature type that converts sound waves into electrical currents in a well-known manner. The microphone incorporates a clip 8 that may be affixed to a garment. Alternatively the microphone may be directly held to a patient by tape or an elastic band. In either case, the microphone is sufficiently small and lightweight so that the patient experiences no discomfort during its usage. Thus, the patient has no incentive to remove the microphone. Microphone 6 is attached to transmitter 12 by a connector 10.

Transmitter 12 is a conventional battery-operated FM radio transmitter of a well-known type. As shown in FIG. 2, the transmitter is preferably small enough to fit inside the pocket of a garment worn by a patient whose coughing rate is to be monitored. Transmitter 12 is tuned to transmit radio waves in an unused portion of the FM radio band.

Receiver 14 comprises a conventional FM radio receiver that may be tuned to receive waves transmitted by transmitter 12. The transmitter waves are received via an antenna 16, and the receiver may be conveniently tuned by manipulating tuning dial 20 and simultaneously observing the needle of tuning meter 18. The gain of the receiver is controlled in a well-known manner by manipulating gain dial 22. In accordance with conventional practice, receiver 14 also includes a loud speaker 24 that is connected through a switch 26 to an output transformer 28. As shown in FIG. 3, output transformer 28 comprises a primary coil 30 and a secondary coil 32.

Conditioning circuit 36 basically comprises a full-wave rectifier 38 that includes diodes 40—43 arranged as shown. The input terminals of the full-wave rectifier are connected through switch 26 to secondary coil 32. The output terminals of rectifier 38 are connected across a resistor 46 that has a sliding contact 48 connected thereto. Contact 48 may be adjusted by manipulation of a threshold dial 49 (FIG. 1). Contact 48 is connected through a capacitor 50 to the gate 58 of a silicon-controlled rectifier 56 that is normally biased in its nonconductive state. The anode of the rectifier is connected to a conventional electrical counter 52 that employs a digit roller dial 54 (FIG. 1). In order to operate the conditioning circuit and counter, 60 cycle, 110 volt electrical power is applied between terminals 60 and 62 from a source not shown.

The operation of the apparatus shown in the drawing, together with the preferred practice of the method aspect of the present invention, will now be described. In order to monitor the coughing rate of the patient shown in FIG. 2, microphone 6 is preferably attached adjacent the voice box of the patient by any convenient means, such as by bandage strips 7. Of course, any convenient method may be used to place the microphone adjacent the patient's throat, such as an elastic band. Alternatively clip 8 may be attached to the collar of a garment worn by the patient. Transmitter 12 is preferably slipped into a pocket of the garment worn by the patient, or, when the patient is in bed, it may be placed on a bedstand.

In accordance with well-known principles, sounds uttered by the patient are converted by the microphone into corresponding electrical currents. These currents are carried through conductor 10 to transmitter 12 where they are used to modulate radiofrequency currents. The modulated currents are used to generate radio waves that are transmitted through the atmosphere. The transmitted waves are received at antenna 16 and are converted into corresponding electrical signals in a well-known manner. Since no wires connect the transmitter and receiver, the patient may leave his area of confinement without interfering with the cough-monitoring process, and sounds uttered by the patient will continue to be converted into waves that are received by receiver 14 even though the patient and receiver are separated by up to about 300 feet.

In order to tune receiver 14 to the frequency of the waves produced by transmitter 12, dial 20 is manipulated and tuning meter 18 is observed. In addition, switch 26 may be thrown to connect speaker 24 to transformer 28 so that sounds uttered by the patient are audible through the speaker. After the receiver is properly tuned, switch 26 is returned to the position shown in FIG. 3, so that the conditioning circuit is operated.

The electrical signals produced by receiver 14 in response to sounds uttered by the patient are conditioned as follows. The gain of receiver 14 is adjusted by manipulating dial 22 until coughing sounds exhibiting power less than a predetermined standard power do not activate counter 52. This feature is extremely important since it enables the type of coughing sounds being monitored to be standardized.

The electrical signals are further conditioned by the adjustment of contact 48 through the manipulation of dial 49. Applicants have discovered that by properly adjusting contact 48, electrical signals corresponding to a cough sound uttered by the patient advance counter 52, whereas signals corresponding to other types of sounds ordinarily cause the counter to remain inactive. Proper adjustment of contact 48 is readily achieved on a trial-and-error basis and depends on the environment in which the overall apparatus is used.

When switch 26 is maintained in the position shown in FIG. 3, the electrical signals produced by receiver 14 pass through transformer 28 and are full-wave rectified by rectifier 38. Subsequently, a portion of the signals are subjected to a substantial amount of filtering by resistor 46 and capacitor 50. Resistor 46 and capacitor 50 also perform a slight delay function. The electrical signals are then impressed on the gate of silicon-controlled rectifier 56 that controls the operation of counter 52. The electrical signals corresponding to cough sounds uttered by the patient trigger the rectifier into conduction, thereby advancing the counter 1 digit, whereas signals corresponding to other types of sounds do not trigger rectifier 56. As a result, the counter remains inactive and is not advanced.

Those skilled in the art will appreciate that the embodiments of the invention shown and described herein are merely exemplary of the preferred practice thereof, and that various modifications in the structure, methods of operation, and details of the embodiments may be affected without departing from the spirit and scope of the invention.

What we claim is:

1. A process for determining the rate at which a human subject coughs by using a microphone, a transmitter connected to the microphone, a receiver tuned to receive waves from the transmitter, and a counter connected to the receiver, comprising the steps of:

locating the microphone adjacent the throat of the subject so that sounds uttered by the subject are converted into corresponding electrical currents;

transmitting waves corresponding to said electrical currents by means of the transmitter;

converting the waves transmitted by the transmitter into corresponding electrical signals in said receiver; and conditioning said electrical signals so that signals corresponding to a cough sound uttered by the subject cause the counter to advance, whereas signals corresponding to other types of sounds cause the counter to remain inactive.

2. A process, as claimed in claim 1, wherein the step of conditioning said electrical signals comprises the step of adjusting the gain of said receiver.

3. A process, as claimed in claim 2, wherein the step of conditioning said electrical signals further comprises the steps of:
   full-wave rectifying said electrical signals; and
   filtering a portion of said full-wave rectified electrical signals.

4. A process, as claimed in claim 1, wherein the microphone is located in contact with the throat of the subject.

5. A process, as claimed in claim 1, wherein the transmitter is a radio transmitter and the receiver is a radio receiver.